United States Patent
Lee et al.

(10) Patent No.: US 12,184,531 B2
(45) Date of Patent: Dec. 31, 2024

(54) METHOD AND DEVICE WITH NETWORK TOPOLOGY FORMATION

(71) Applicant: SAMSUNG ELECTRONICS CO., LTD., Suwon-si (KR)

(72) Inventors: Jongwook Lee, Suwon-si (KR); Young Jun Hong, Suwon-si (KR); Wonseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 18/308,872

(22) Filed: Apr. 28, 2023

(65) Prior Publication Data

US 2024/0179086 A1 May 30, 2024

(30) Foreign Application Priority Data

Nov. 30, 2022 (KR) .................. 10-2022-0164817

(51) Int. Cl.
*G06F 15/173* (2006.01)
*H04L 45/02* (2022.01)

(52) U.S. Cl.
CPC .................... *H04L 45/02* (2013.01)

(58) Field of Classification Search
CPC ..................................................... H04L 45/02
See application file for complete search history.

(56) References Cited

U.S. PATENT DOCUMENTS

| | | |
|---|---|---|
| 9,614,786 B2 | 4/2017 | Kim et al. |
| 9,699,067 B2 | 7/2017 | Haramaty et al. |
| 11,005,724 B1 | 5/2021 | Shpigelman et al. |
| 11,190,405 B2 | 11/2021 | Phadke et al. |
| 2004/0199792 A1 | 10/2004 | Tan et al. |
| 2013/0108259 A1 | 5/2013 | Srinivas et al. |
| 2018/0316599 A1 | 11/2018 | McDonald |
| 2021/0194769 A1 | 6/2021 | Sridhar et al. |
| 2024/0154906 A1* | 5/2024 | Ramanan ................ H04L 45/76 |

FOREIGN PATENT DOCUMENTS

EP      2 461 254 A1    6/2012

OTHER PUBLICATIONS

Extended European search report issued on Mar. 26, 2024, in counterpart European Patent Application No. 23180013.7 (8 pages).

* cited by examiner

*Primary Examiner* — Joseph R Maniwang
(74) *Attorney, Agent, or Firm* — NSIP Law

(57) ABSTRACT

A device includes: a processor configured to execute instructions in a memory, wherein, the instructions are configured to cause the processor to: select a first network group from among network groups, wherein the first network group is selected from among the network groups based on numbers of global links connecting the network groups, respectively; obtain a first list of network groups, among the network groups, that are not connected to the first network group; select a second network group and a third network group from among the network groups in the first list based on connections between the network groups in the first list; and based on the selecting of the first, second, and third network groups, form a topology including global links connecting the first network group, the second network group, and the third network group each to each other.

20 Claims, 14 Drawing Sheets

METHOD AND DEVICE WITH NETWORK TOPOLOGY FORMATION

CROSS-REFERENCE TO RELATED APPLICATIONS

This application claims the benefit under 35 USC § 119(a) of Korean Patent Application No. 10-2022-0164817 filed on Nov. 30, 2022, in the Korean Intellectual Property Office, the entire disclosure of which is incorporated herein by reference for all purposes.

BACKGROUND

1. Field

The following description relates to a method and device with network topology formation.

2. Description of Related Art

Supercomputers are used for various purposes, such as, for example, weather prediction, nuclear simulation, cosmological constant calculation, material development, semiconductor process simulation, and artificial intelligence.

Supercomputers may be improved through scale-up and/or scale-out. Scale-up involves improving the performance of hardware components (e.g., a central processing unit (CPU), an accelerator, and a memory) of a supercomputer's servers. Scale-out involves increasing the performance of a supercomputer by connecting more servers through a network. Scale-out has become important for improving the performance of a supercomputer due to the hardware components approaching the limit of Moore's law.

A topology is a connecting relationship between devices (e.g., servers) included in a network system (e.g., a supercomputer or a data center). Some examples of supercomputer topologies include, for example, torus topology, fat-tree topology, and dragonfly topology.

The above description is information the inventor(s) acquired during the course of conceiving the present disclosure, or already possessed at the time, and is not necessarily art publicly known before the present application was filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a device includes: a memory including instructions; and one or more processors electrically connected with the memory and configured to execute the instructions, wherein the instructions are configured to, when executed by the one or more processors, cause the one or more processors to perform operations including: selecting a first network group from among network groups, wherein the first network group is selected from among the network groups based on numbers of global links connecting the network groups, respectively; obtaining a first list of network groups, among the network groups, that are not connected to the first network group; selecting a second network group and a third network group from among the network groups in the first list based on connections between the network groups in the first list; and based on the selecting of the first, second, and third network groups, forming a topology including global links connecting the first network group, the second network group, and the third network group each to each other.

Each of the network groups may include a respective plurality of servers and a respective plurality of switches.

Each network group may further include a plurality of servers, and each plurality of switches is connected by a respective local link to the plurality of servers in its network group.

Each plurality of switches may be connected by a global link to the plurality of switches in its network group.

The selecting of the first network group may include selecting, as the first network group, a network group among the network groups determined to have the least number of global links among the network groups.

The selecting of the second network group and the third network group may include: obtaining a second list of network group pairs in the first list, wherein each of the network groups in each pair in the second list are not connected to each other; selecting one network group pair from among the network group pairs in the second list based on a number of global links corresponding to the one network group; selecting one of the network groups from the one network group pair as the second network group; and selecting the other of the network groups from the one network group pair as the third network group.

The selecting of the one network group pair may include selecting, as the one network group pair, the network group pair in the second list of network group pairs that has the least number of global links among the network group pairs in the second list.

The forming of the topology may include: selecting a first switch from the first network group, a second switch from the second network group, and a third switch included from the third network group, the selecting based on the numbers of ports of the respective switches in each of the first, second, and third network group; and forming the topology to include global links connecting the first switch, the second switch, and the third switch each to each other.

The numbers of the ports may be numbers of available ports.

Each of the first switch, the second switch, and the third switch may have two or more available ports.

The global links may include Peripheral Component Interconnect Express (PCIe) links.

The global links may be links of a PCIe-based fabric.

In another general aspect, a routing device for a network generated by any of the devices includes: a memory including instructions; and a processor electrically coupled with the memory and configured to execute the instructions, wherein, the instructions are configured to, when executed by the processor, cause the processor to perform operations including: obtaining information about routes between a departure network group and an arrival network group; and transmitting traffic using, as selected from among switches included in the departure network group, a first switch connected to a first route that directly connects the departure network group and the arrival network group.

The transmitting of the traffic may include transmitting the traffic through the first route.

The transmitting of the traffic may include transmitting the traffic through a second route other than the first route among routes connected to the first switch, wherein the second route is selected for the transmitting thereby based on a state of the first route.

The second route may be a route, other than the first route, determined to have the least number of hop counts among the routes connected to the first switch.

The transmitting of the traffic may include transmitting the traffic using a second switch other than the first switch among the plurality of switches, wherein the second switch is selected for the transmitting based on hop counts of respective routes connected to the first switch.

The selecting of the second switch may be responsive to determining that the hop count of the second switch is greater than or equal to a threshold value.

The second switch may be connected to a route having the least hop count among the switches not including the first switch.

In another general aspect, a network system includes network groups, wherein each of the network groups includes: servers; and network switches for communication among the network groups, wherein the network groups are connected to each other based on a topology generated by any of the devices.

Other features and aspects will be apparent from the following detailed description, the drawings, and the claims.

Figure 1:
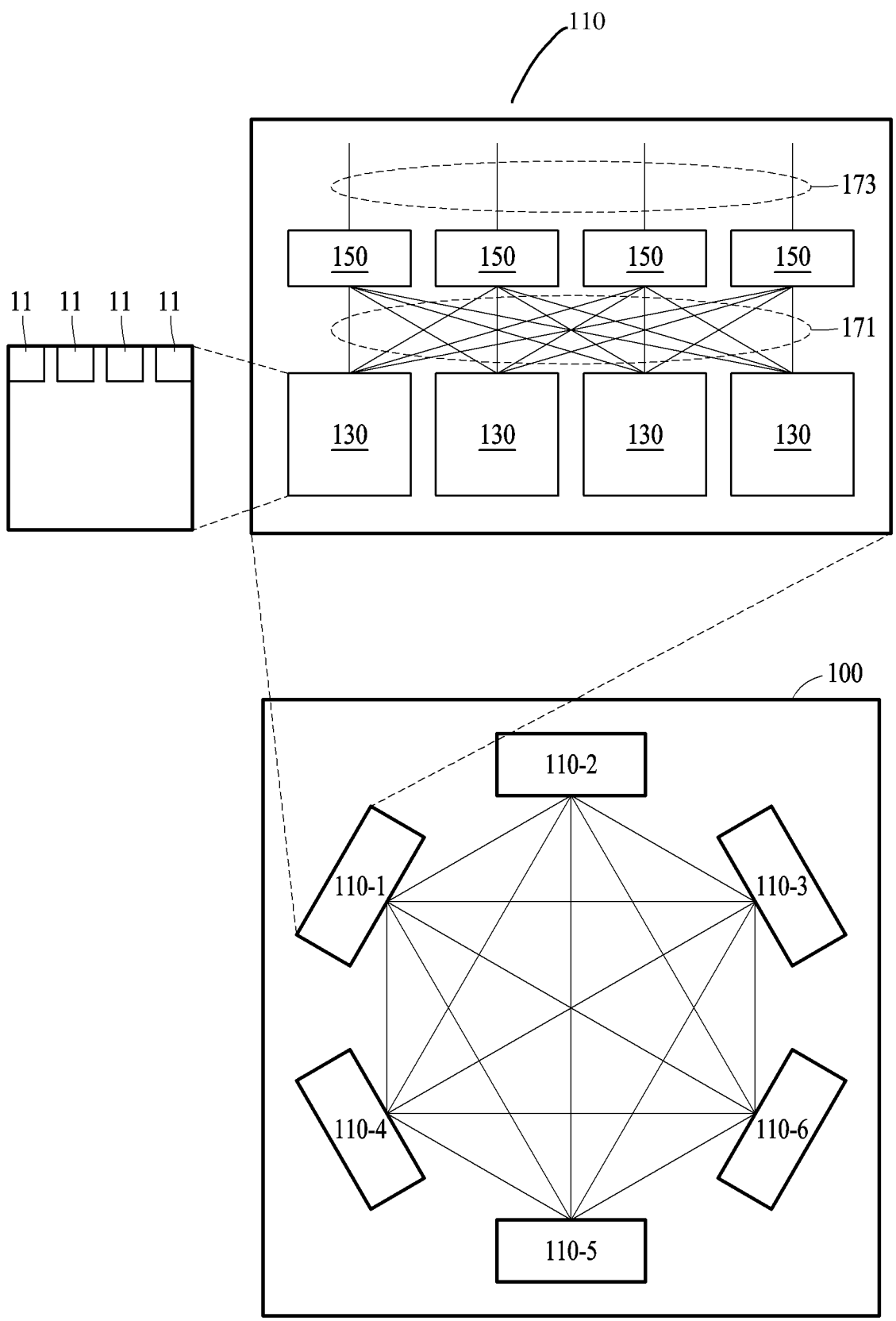
FIG. 1 illustrates an example network system according to one or more example embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example network system according to one or more example embodiments.

Referring to FIG. 1, a network system 100 (e.g., a supercomputer, a data center, or a distributed system) may include network groups 110. The network groups 110 may be connected to each other through global links 173 connected to switches 150 (e.g., network switches) included in each of the network groups 110. FIG. 1 shows an example of six network groups 110-1 to 110-6. However, the numbers of network groups, servers, switches, and network cards illustrated in FIG. 1 are only examples and other numbers of such components may be used.

In an example, each network group 110 may include servers 130 and switches 150. The servers 130 may be connected to the switches 150 through local links 171. The local links 171 may connect network cards 11 in the servers 130 and the switches 150.

In an example, each of the servers 130 may include components such as network cards 11 (e.g., network interface cards (NICs)) and a processor. The processor may be coupled to the network cards 11 through an interface (e.g., a peripheral component interconnect express (PCIe) bus and/or a compute express link (CXL)).

Figure 2:
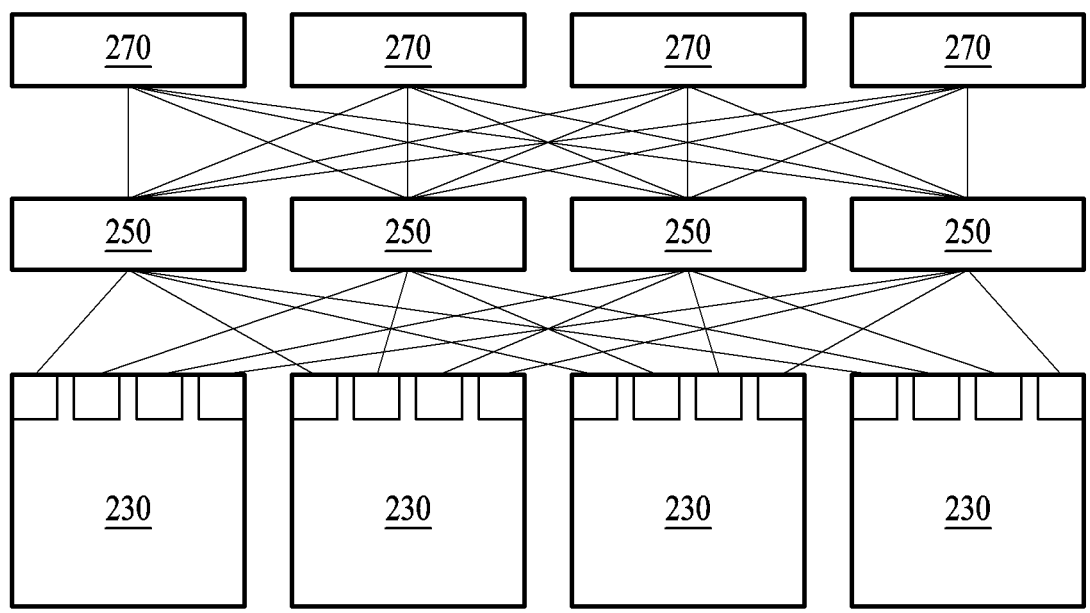
FIG. 2 illustrates an example network group.

FIG. 2 illustrates an example network group.

Referring to FIG. 2, a network group 200 may be based on a dragonfly topology or a modified dragonfly topology (e.g., a dragonfly plus topology).

The network group 200 may include servers 230, first-layer switches 250, and second-layer switches 270. The servers 230 may be connected to the first-layer switches 250. The first-layer switches 250 may be connected to the second-layer switches 270. The first-layer switches 250 may not be directly connected to each other but may have indirect connectivity to each other through the second-layer switches 270. The second-layer switches 270 may also not be directly connected to each other. The second-layer switches 270 may be connected to second-layer switches (not shown) included in network groups (not shown). In other words, in some implementations, the first-layer switches 250 may only connect second-layer switches 270 to servers 230.

As noted, there may be no direct connections between switches in a same layer of a network group, however, there may be indirect connections between those same-layer switches through the switches in the other layer. A reason for this direct and indirect connectivity between switches may be to enable transmission of data between two network groups, e.g., a departure network group and an arrival network group through a non-minimal route (in terms of hops). The departure network group described herein refers to a departure point of data transmission, and the arrival network group described herein refers to a destination of the data transmission.

Figure 3:
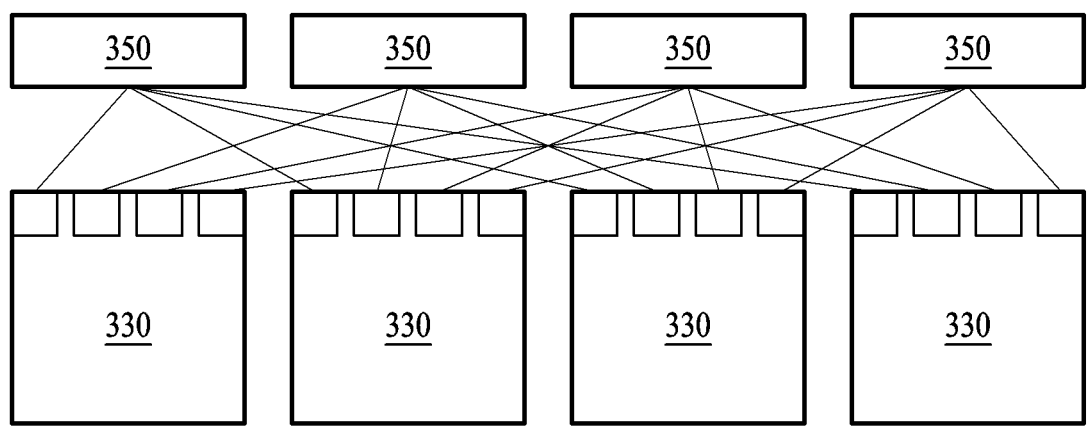
FIG. 3 illustrates an example network group according to one or more example embodiments.

FIG. 3 illustrates an example network group according to one or more example embodiments.

Referring to FIG. 3, a network group 300 (e.g., one of the network groups 110 of FIG. 1) may include servers 330 (e.g., the servers 130 of FIG. 1) and switches 350 (e.g., the switches 150 of FIG. 1 and the first-layer switches 250 of FIG. 2). The switches 350 are not directly connected to each other. There are also no indirect connection between the switches 350 through switches of another layer (e.g., the second-layer switches 270 of FIG. 2), as such other layer may not be include. A network system including the network group 300 may require a topology suitable for routing between network groups (e.g., the network groups 110 of FIG. 1).

Figure 4:
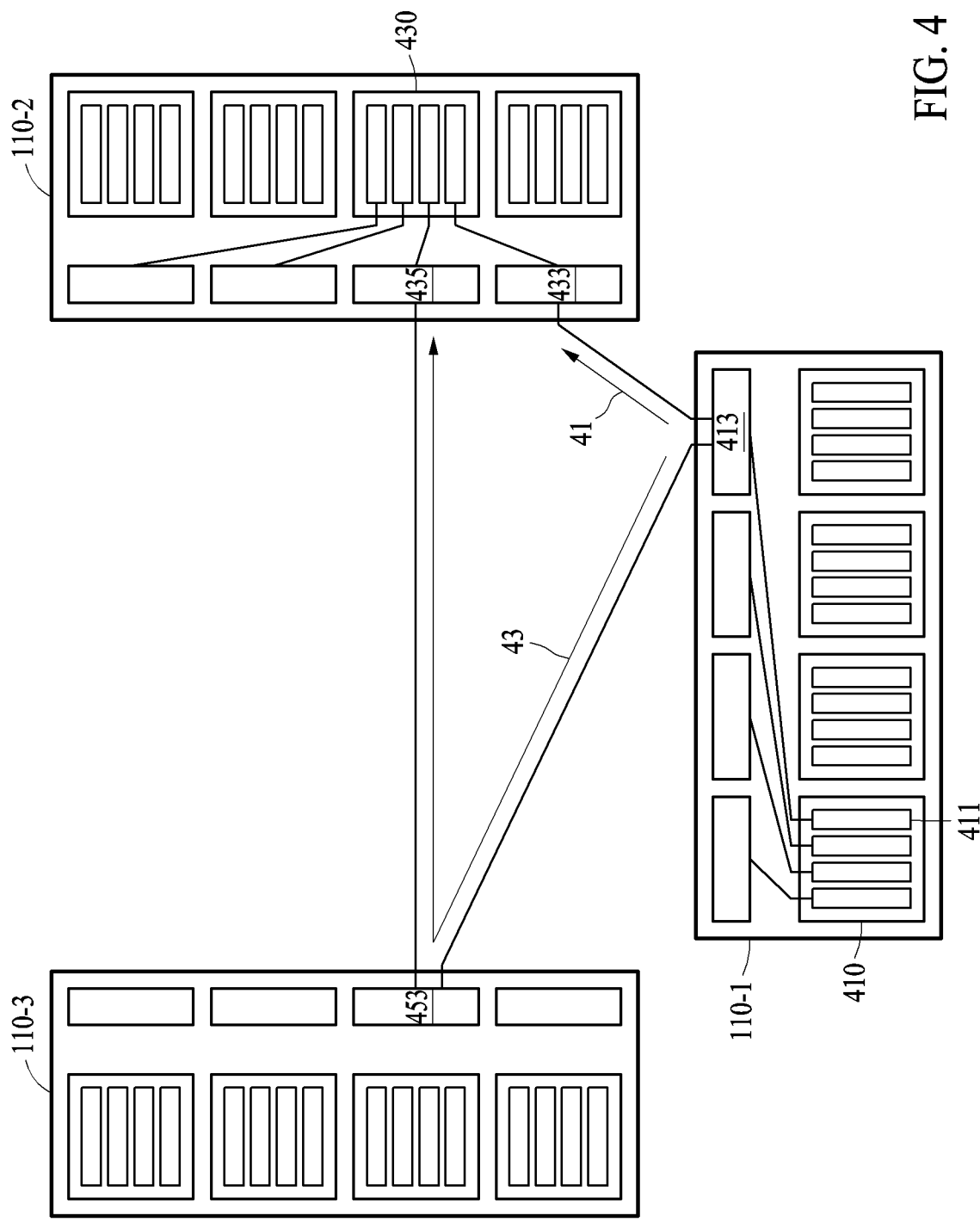
FIG. 4 illustrates an example route according to one or more example embodiments.

FIG. 4 illustrates an example route according to one or more example embodiments.

Referring to FIG. 4, a network system (e.g., the network system 100 of FIG. 1) may include various routes between network groups (e.g., the network groups 110 of FIG. 1). Hereinafter, an example case in which the network system 100 includes three network groups 110-1, 110-2, and 110-3 is described.

In an example, traffic (e.g., network transmission data) of a server 410 of a departure network group 110-1 may be transmitted to a server 430 of an arrival network group 110-2 through a minimal route 41. For example, the traffic of the server 410 may be transmitted using switches 413 and 433 forming the minimal route 41 ("minimal" in terms of network/hop distance). The server 410 may select a network card 411 (or virtual network card) to be connected to the switch 413 to transmit the traffic.

When the traffic of the server 410 is not to be transmitted through the minimal route 41, the traffic of the server 410 may be transmitted to the arrival network group 110-2 through another route 43 (i.e., a non-minimal route). For example, the traffic of the server 410 may be transmitted using switches 413, 453, and 435 forming the other route 43.

In an example, the network groups 110 may be connected to each other based on a topology including a large number of 1-extra-hop routes. An "n-extra-hop" route, as used herein, refers to a route having n more hops than a minimal route. The other route 43 in FIG. 4 is a 1-extra-hop route (having one more hop than the minimal route 41).

Figure 5:
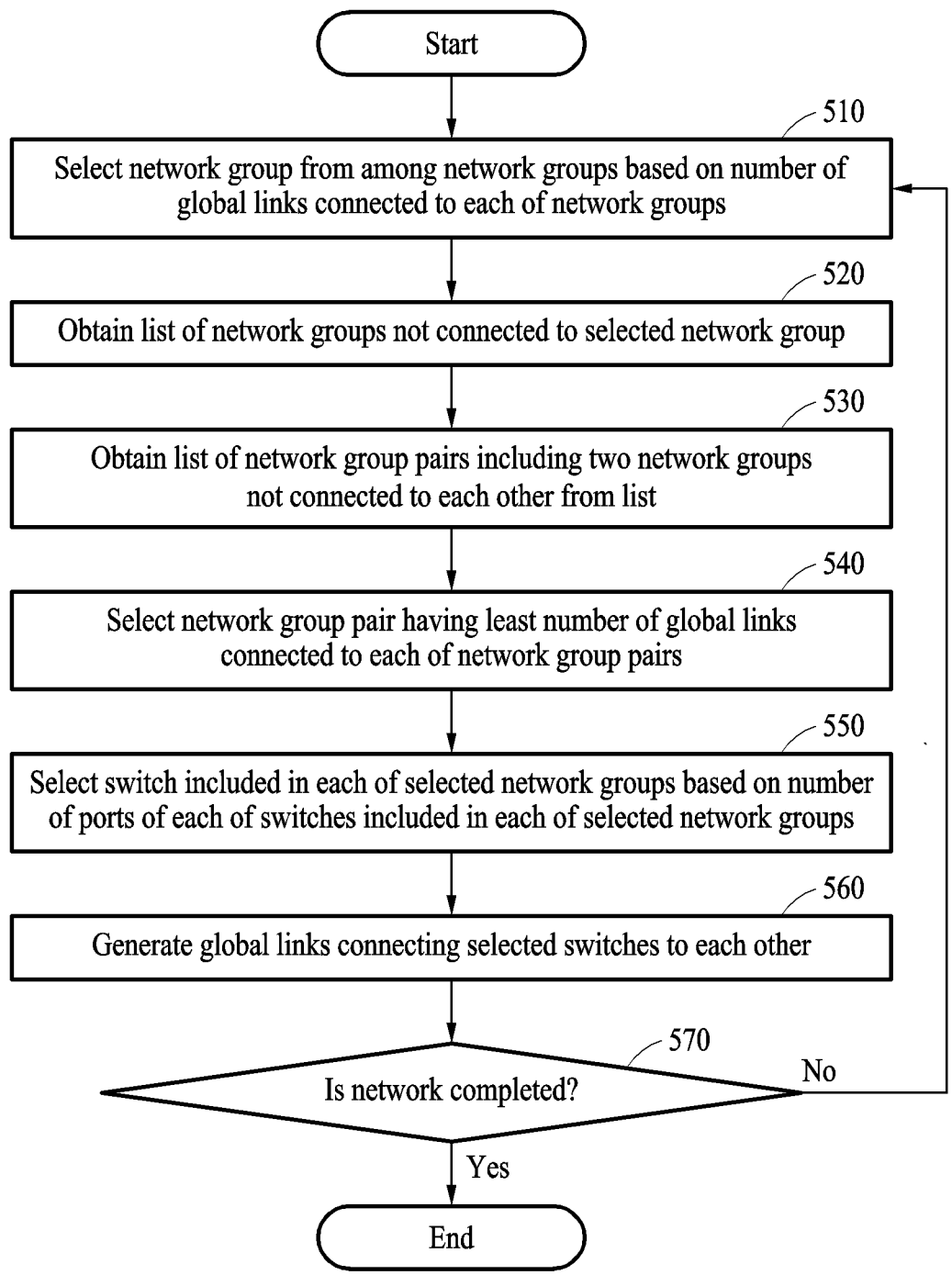
FIG. 5 illustrates an example flow of operations in a topology generation method according to one or more example embodiments.
Figure 6:
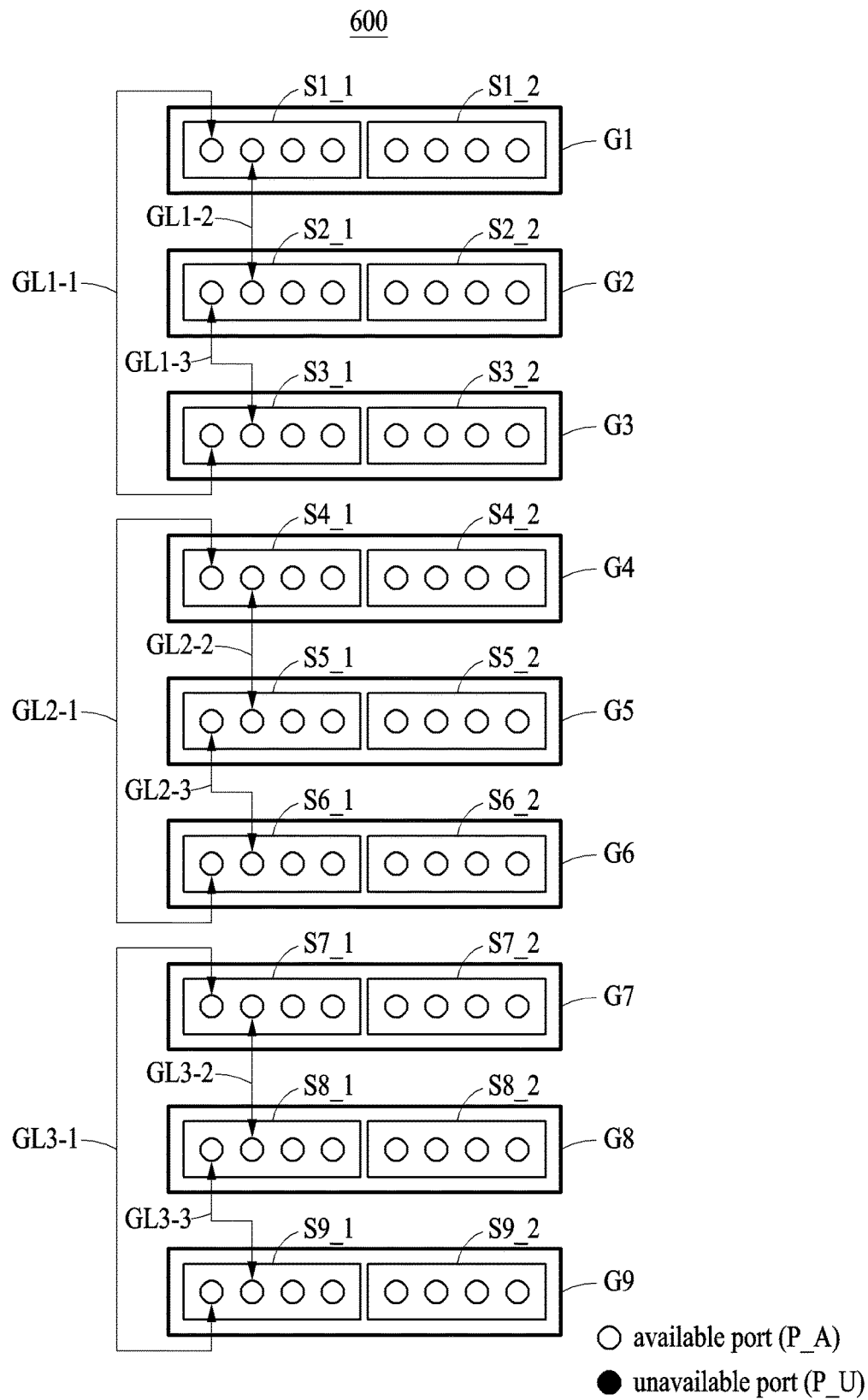
FIG. 6 illustrates an example topology generation method according to one or more example embodiments.
Figure 7:
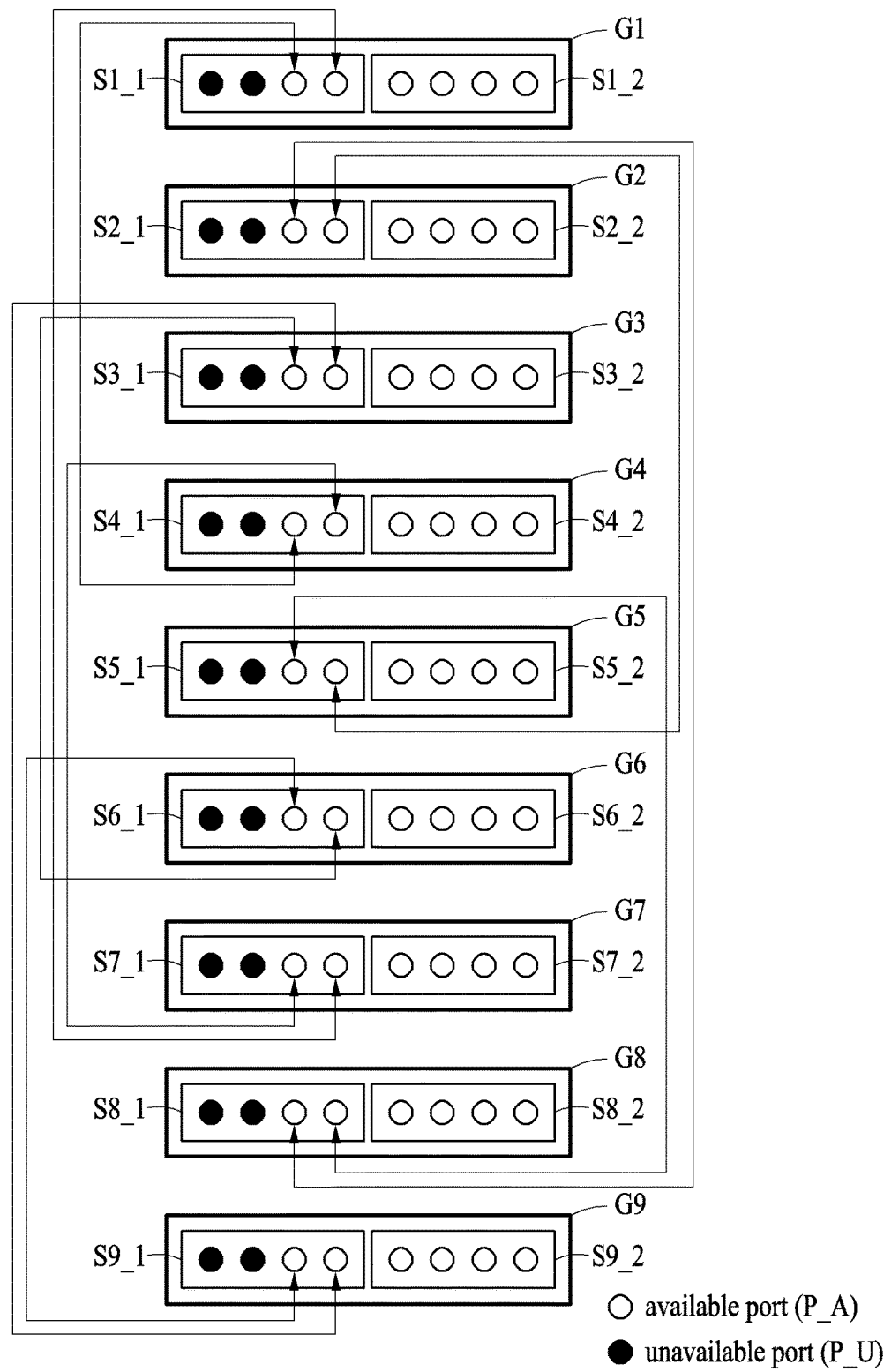
FIG. 7 illustrates an example topology generation method according to one or more example embodiments.
Figure 8:
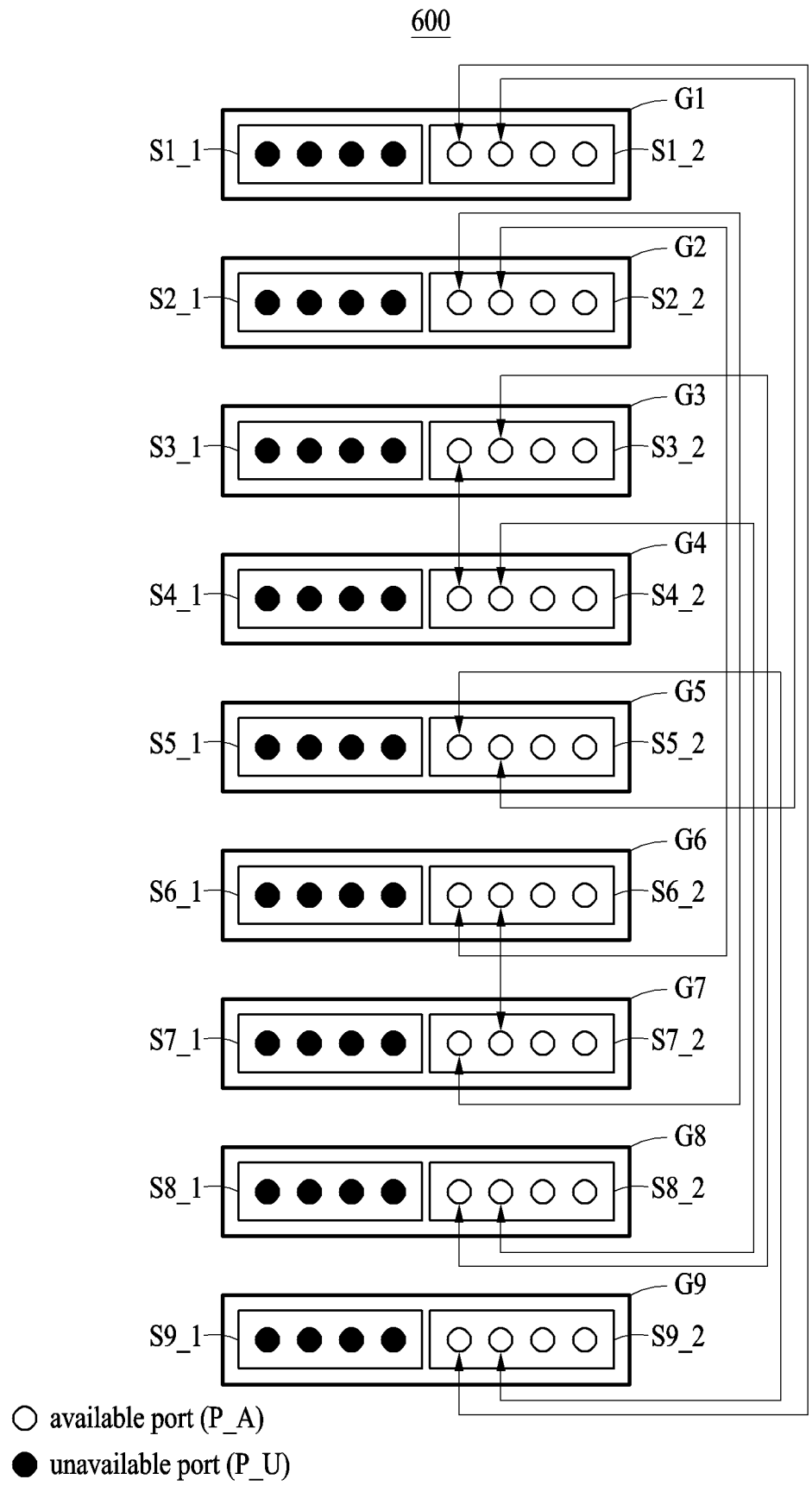
FIG. 8 illustrates an example topology generation method according to one or more example embodiments.
Figure 9:
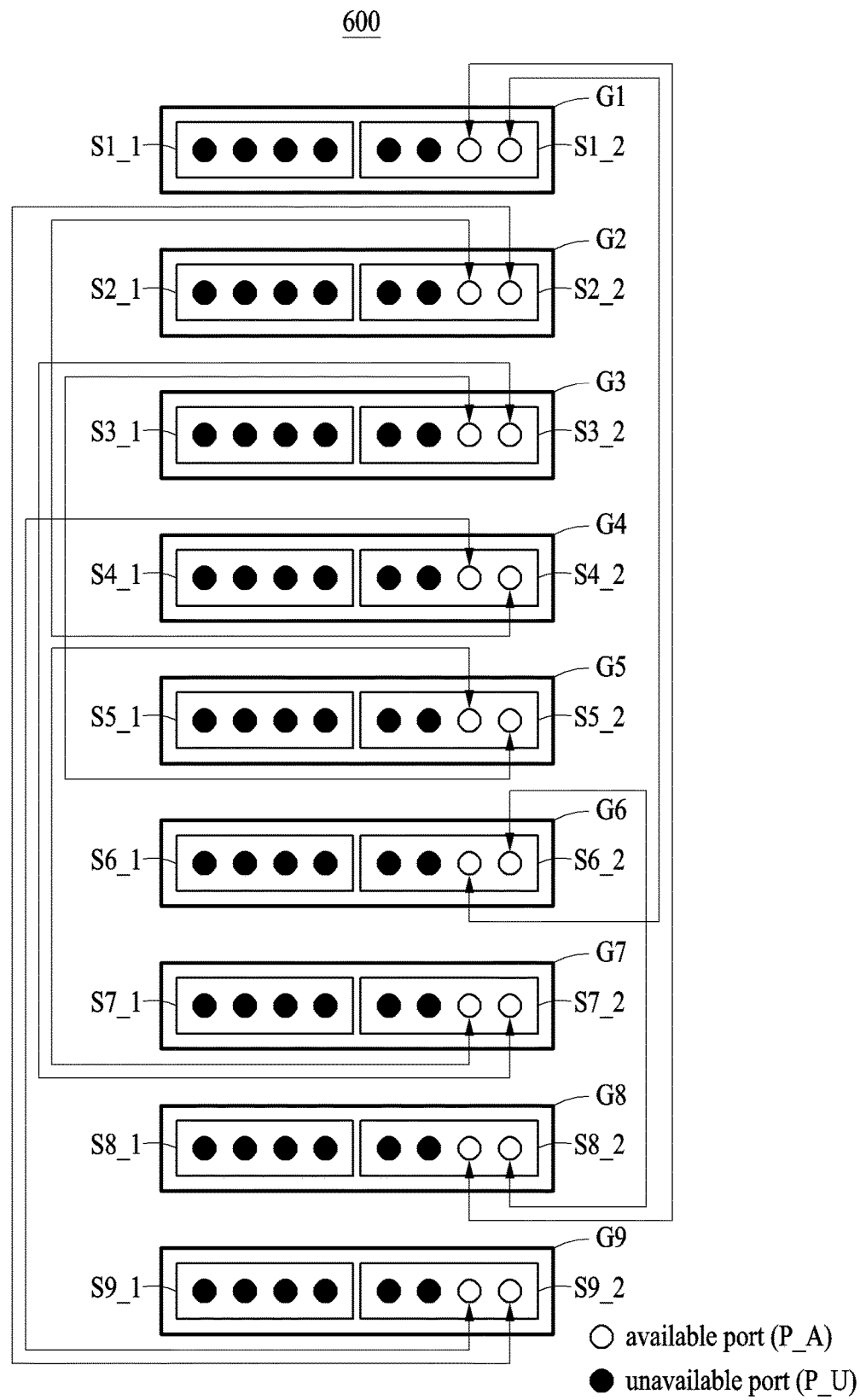
FIG. 9 illustrates an example topology generation method according to one or more example embodiments.

FIG. 5 illustrates an example of a topology generation method (e.g., a first topology generation algorithm) according to one or more example embodiments, and FIGS. 6 through 9 illustrate examples of a topology according to one or more example embodiments. Hereinafter, an example case in which a network system 600 (e.g., the network system 100 of FIG. 1) includes nine network groups G1 to G9 (e.g., the network groups 110 of FIG. 1). The number of network groups (e.g., G1 to G9), the number of switches (e.g., S1_1 to S9_1 and S1_2 to S9_2), and the number of ports (e.g., P_A (available) and P_U (unavailable)), illustrated in FIGS. 5 through 8 are merely examples and the numbers of such components may vary.

In operation 510, a topology generation device (e.g., topology generation device 1700 of FIG. 17) may select a network group from among the available network groups based on the numbers of global links (e.g., the global links 173 of FIG. 1) connected to the respective network groups (e.g., G1 to G9). For example, the topology generation device 1700 may select a network group (e.g., network group G1) determined to have the least number of global links from among the network groups G1 to G9.

In operation 520, the topology generation device 1700 may obtain a list of network groups (e.g., network groups G2 to G9) not connected to the network group G1 selected in operation 510.

In operation 530, the topology generation device 1700 may generate an initial list of unique network group pairs including two network groups not connected to each other from the list of network groups G2 to G9. For example, the list of network group pairs may be as follows.

LIST OF NETWORK GROUP PAIRS (G2, G3), (G2, G4), (G2, G5), (G2, G6), (G2, G7), (G2, G8), (G2, G9), (G3, G4), (G3, G5), (G3, G6), (G3, G7), (G3, G8), (G3, G9), (G4, G5), (G4, G6), (G4, G7), (G4, G8), (G4, G9), (G5, G6), (G5, G7), (G5, G8), (G5, G9), (G6, G7), (G6, G8), (G6, G9), (G7, G8), (G7, G9), (G8, G9)

In operation 540, the topology generation device 1700 may select a network group pair having the least number of global links connected to each of the network groups in the pair (i.e., the total global links for the pair) from among the network group pairs in the list. In an example, when there are multiple network group pairs having the least number of global links, the topology generation device 1700 may select any of those one of those network group pairs (e.g., a network group pair (G2, G3)) having the least number of global links.

At this point, three network groups have been selected; the network group with the least global links, and the network groups in the selected network group pair (e.g., G1, G2, and G3).

In operation 550, the topology generation device 1700 may select a switch for each of the respective selected network groups (e.g., G1, G2, and G3) based on the number of ports P_A (available) and P_U (unavailable) of the switches included in each of the selected network groups G1 (switches S1_1 and S1_2), G2 (switches S2_1 and S2_2), and G3 (switches S3_1 and S3_2). For example, the topology generation device 1700 may select whichever switches (e.g., switches S1_1, S2_1, and S3-1) have two or more available ports P_A from among the switches S1_1 to S3_1 and S1_2 to S3_2 included in the selected network groups G1, G2, and G3.

In operation 560, the topology generation device 1700 may generate (or assign/allocate) global links GL1-1 to GL1-3 connecting the selected switches S1_1, S2_1, and S3_1 to each other (using the available ports thereof). In an example, the global links may be generated such that each selected switch may be connected (linked) to each other selected switch.

In operation 570, the topology generation device 1700 may verify whether a network of the network system 600 is completed (e.g., entire network groups are connect to each other). When the network is not completed, the topology generation device 1700 may repeatedly perform operations 510 to 570. For example, the topology generation device 1700 may generate global links GL2-1 to GL2-3 connecting the network groups G4 to G6 by repeatedly performing operations 510 to 570. In addition, the topology generation device 1700 may generate global links GL3-1 to GL3-3 connecting the network groups G7 to G9 by repeatedly performing operations 510 to 570.

Referring to FIGS. 5 and 7 to 9, the topology generation device 1700 may complete the network of the network system 600 by repeatedly performing operations 510 to 570. For example, the topology generation device 1700 may generate a topology including global links connecting the network groups G1 to G9 by repeatedly performing operations 510 to 570.

In an example, the topology generation device 1700 may generate a topology providing as many 1-extra-hop routes (e.g., the route 43 of FIG. 4) as possible.

Figure 10:
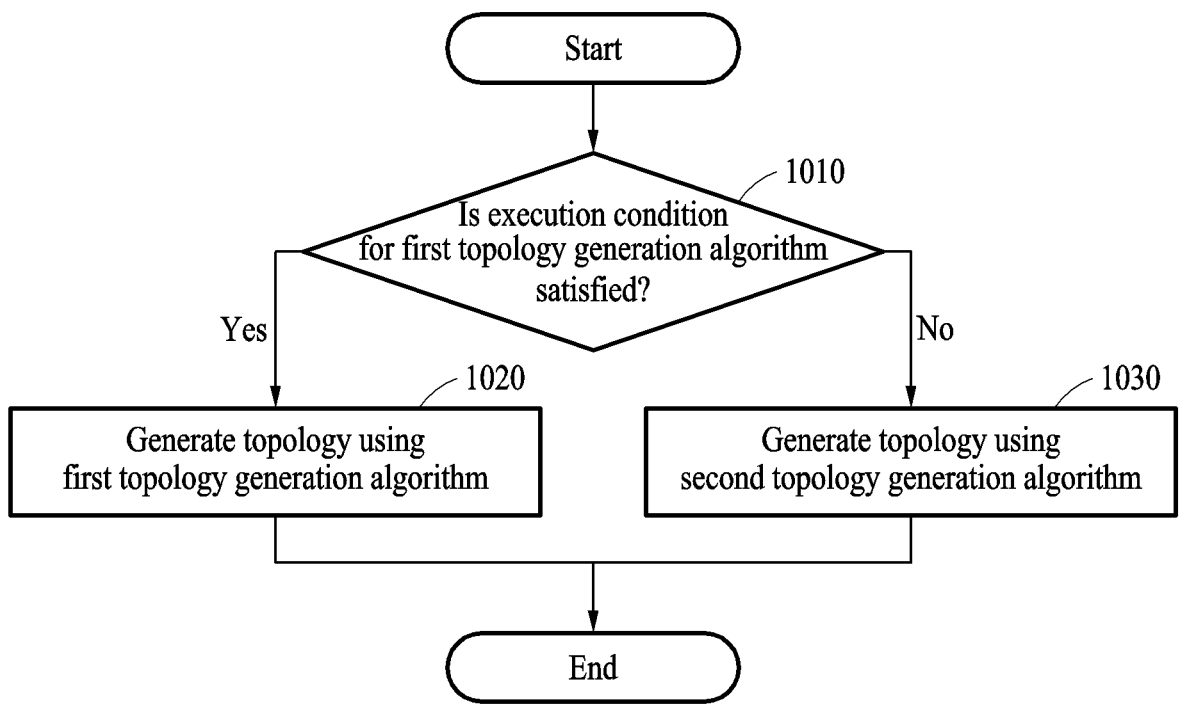
FIG. 10 illustrates an example flow of operations in a topology generation method according to one or more example embodiments.

FIG. 10 illustrates an example flow of operations in a topology generation method according to one or more example embodiments.

Referring to FIG. 10, a topology generation device (e.g., the topology generation device 1700 of FIG. 17) may complete a network of a network system (e.g., the network system 100 of FIG. 1 and the network system 600 of FIGS. 6 through 9) using one or more topology generation algorithms. For example, the topology generation device 1700 may complete a network of the network system 600 using a first topology generation algorithm (e.g., a topology generation algorithm of FIGS. 5 to 9) and/or a second topology generation algorithm (e.g., a topology generation algorithm of FIGS. 11 and 12). FIG. 10 illustrates an example of selecting a topology generation algorithm from among multiple topology generation algorithms.

In operation 1010, the topology generation device 1700 may verify whether an execution condition for each of operations (e.g., operations 510 to 560 of FIG. 5) of the first topology generation algorithm is satisfied.

In operation 1020, when the execution condition for each of the operations 510 to 560 of the first topology generation algorithm is satisfied, the topology generation device 1700 may generate a topology using the first topology generation algorithm.

In operation 1030, when the execution condition for any of the operations 510 to 560 of the first topology generation algorithm is not satisfied, the topology generation device 1700 may generate a topology using the second topology generation algorithm. For example, when operation 520 does not generate a list of network groups, or when operation 540 cannot find any group pair having a least number of global links, or when operation 550 cannot find any groups having a requisite number of ports available.

In an example, the topology generation device 1700 may preferentially use the first topology generation algorithm, and when an execution condition for the first topology generation algorithm is not satisfied (when the first topology generation algorithm can no longer build the topology), the topology generation device 1700 may complete the topology using the second topology generation algorithm.

Figure 11:
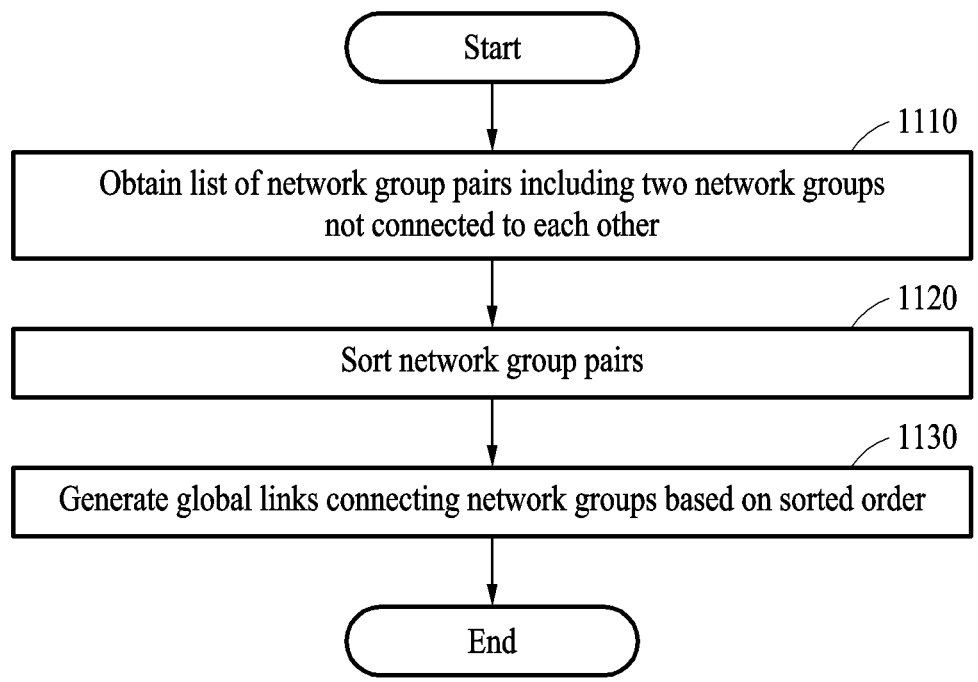
FIG. 11 illustrates an example flow of operations in a topology generation method according to one or more example embodiments.
Figure 12:
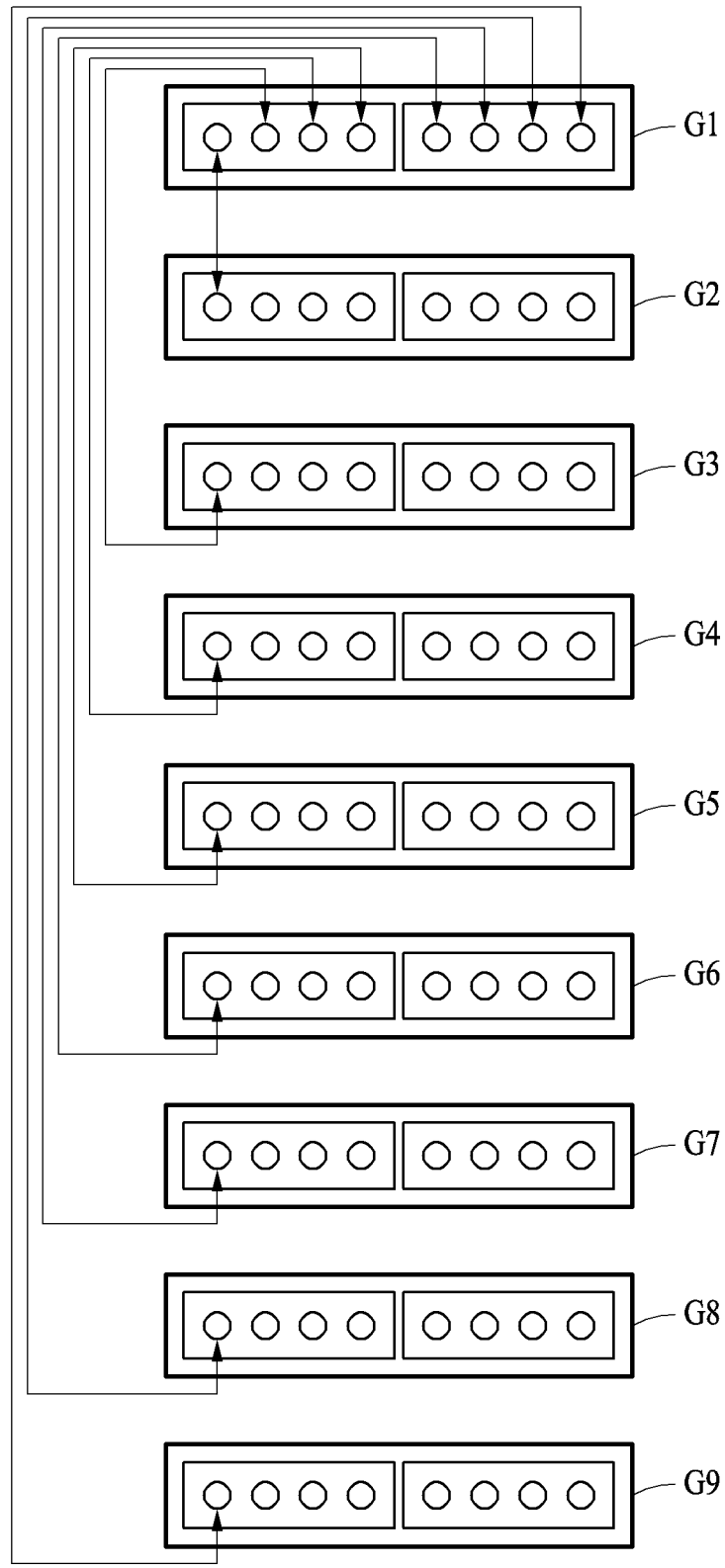
FIG. 12 illustrates an example of a topology generation method according to one or more example embodiments.

FIG. 11 illustrates an example topology generation method (e.g., a second topology generation algorithm) according to one or more embodiments, and FIG. 12 illustrates an example topology according to one or more embodiments. FIG. 12 illustrates a process of generating a network of the network system 600 (e.g., the network system 100 of FIG. 1) using only the second topology generation algorithm. However, the example illustrated in FIG. 12 is provided for the convenience of description. In an example, the network topology of the network system 600 may be generated based on the first topology generation algorithm (e.g., the first topology generation algorithm of FIGS. 5 to 9), and when an execution condition for the first topology generation algorithm is not satisfied, the second topology generation algorithm may be used to complete or form the network topology.

In operation 1110, a topology generation device (e.g., the topology generation device 1700 of FIG. 17) may obtain a list of network group pairs determined to be not connected to each other (the two network groups in a pair are not connected to each other). For example, the topology generation device 1700 may obtain the following network group pairs.

LIST OF NETWORK GROUP PAIRS (G1, G2), (G1, G3), (G1, G4), (G1, G5), (G1, G6), (G1, G7), (G1, G8), (G1, G9), (G2, G3), (G2, G4), (G2, G5), (G2, G6), (G2, G7), (G2, G8), (G2, G9), (G3, G4), (G3, G5), (G3, G6), (G3, G7), (G3, G8), (G3, G9), (G4, G5), (G4, G6), (G4, G7), (G4, G8), (G4, G9), (G5, G6), (G5, G7), (G5, G8), (G5, G9), (G6, G7), (G6, G8), (G6, G9), (G7, G8), (G7, G9), (G8, G9)

In operation 1120, the topology generation device 1700 may sort the list of network group pairs. For example, the topology generation device 1700 may sort the list based on the number of network groups (e.g., G1 to G9) included in the list.

In operation 1130, the topology generation device 1700 may generate global links connecting the network groups included in the list based on the sorted order of the network group pairs. FIG. 12 illustrates a process of generating global links for a network group (e.g., G1). A process of generating global links for the remaining network groups G2 to G9 may be substantially the same as the process of generating global links for the network group G1.

The routes generated as described herein may be stored as routing tables in the switches, the servers, other network devices, and so forth. Routes generated or formed as described herein may also (or alternatively) be formed as a data structure in a controller, a fabric manager, a server application(s) running on a server device, or the like.

Figure 13:
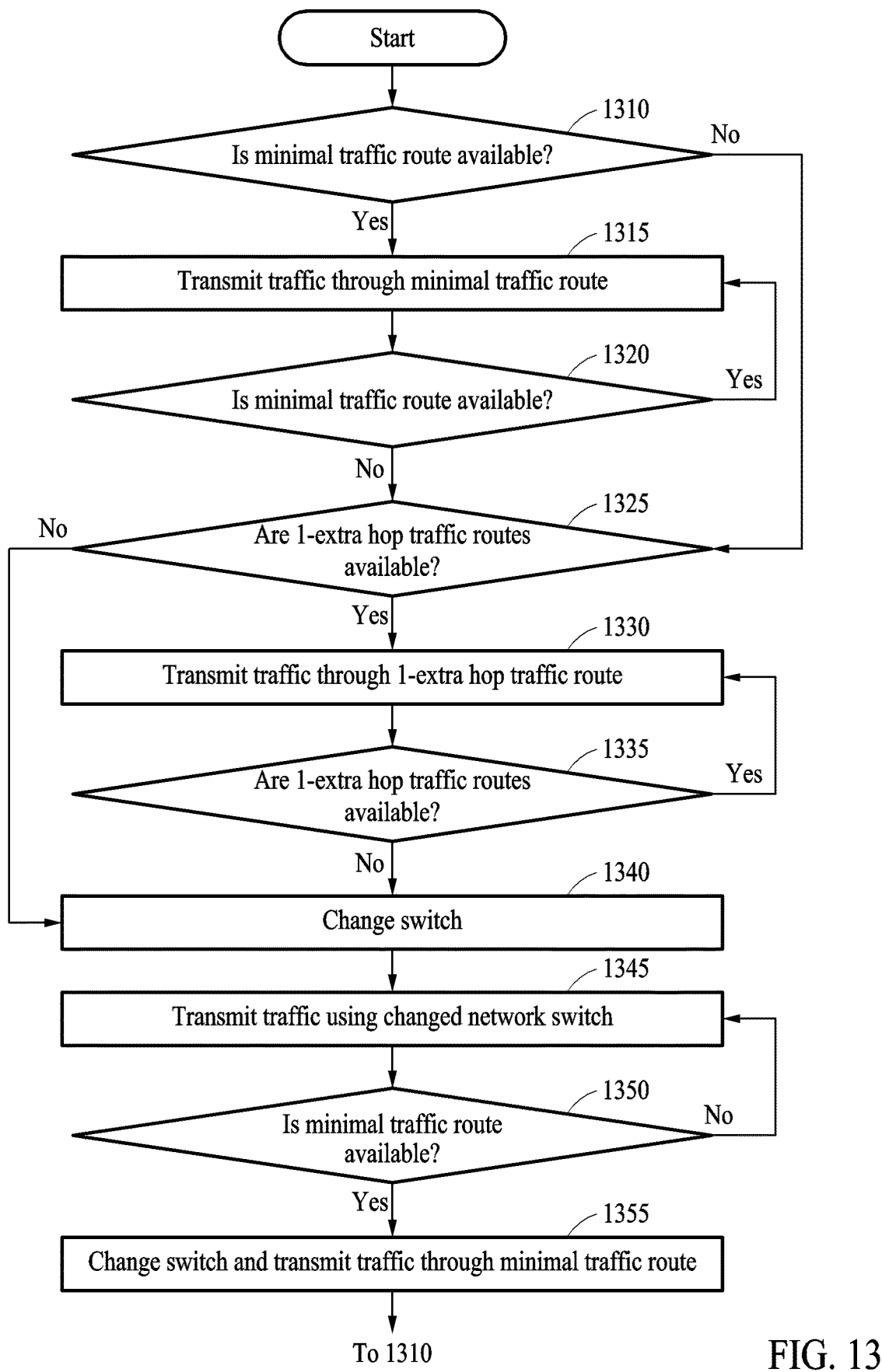
FIG. 13 illustrates an example flow of operations in a routing method according to one or more example embodiments.
Figure 14:
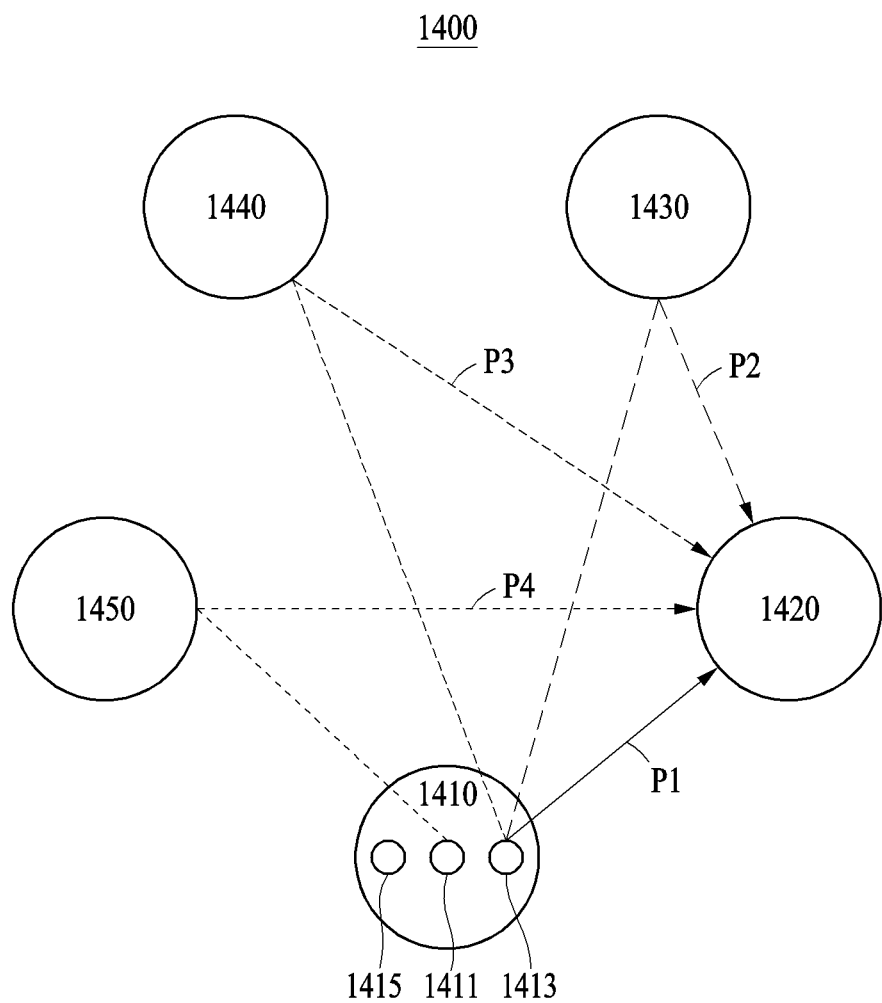
FIG. 14 illustrates an example routing method according to one or more example embodiments.

FIG. 13 illustrates an example of a routing method according to one or more example embodiments, and FIG. 14 illustrates an example of a routing method for a network system 1400 (e.g., the network system 100 of FIG. 1 and the network system 600 of FIGS. 6 to 9 and 12) including network groups 1410 to 1450.

In operation 1310, a routing device (e.g., a routing device 1800 of FIG. 18) may verify a state of a minimal route P1 between a departure network group (e.g., a network group 1410) and an arrival network group (e.g., a network group 1420). For example, when the minimal route P1 is disconnected and/or the minimal route P1 is congested, the routing device 1800 may determine that the minimal route P1 is effectively unavailable. Any known congestion detection techniques may be used.

In operation 1315, when the minimal route P1 is available, the routing device 1800 may select a network switch 1413 connected to the minimal route P1, and the routing device 1800 may route traffic through the minimal route P1. In an example, the routing device 1800 may select a network card connected to the network switch 1413 from among network cards in a server and route the traffic to the switch 1413 using the selected network card.

In operation 1320, the routing device 1800 may again verify whether the minimal route P1 is available (e.g., whether it meets a performance threshold such as a latency and/or bandwidth minimum).

In operation 1325, when the minimal route P1 is determined to be unavailable, the routing device 1800 may verify whether any 1-extra-hop routes (e.g., routes P2 and P3)) connected to the switch 1413 connected to the minimal route P1 are available.

In operation 1330, the routing device 1800 may transmit the traffic through an available 1-extra-hop route (e.g., the route P2) from among the 1-extra-hop routes P2 and P3 connected to the switch 1413.

In operation 1335, the routing device 1800 may verify again whether the 1-extra-hop routes P2 and P3 are available.

In operation 1340, when the 1-extra-hop routes P2 and P3 connected to the switch 1413 connected to (or intersecting) the minimal route P1 are unavailable, the routing device 1800 may change a switch for traffic transmission. The routing device 1800 may select any one switch from between switches 1411 and 1415 included in the network group 1410. For example, the routing device 1800 may select one switch from between the switches 1411 and 1415 based on hop counts of routes connected to the switches 1411 and 1415. For example, the routing device 1800 may select the switch 1411 connected to a 1-extra-hop route P4. As a non-limiting example, a condition for changing the switch for traffic transmission from the switch 1413 to the switch 1411, as illustrated in FIGS. 13 and 14, may be determining availability of 1-extra-hop routes being connected to the switch 1413 (e.g., routes P2 and P3). For example, when the 1-extra-hop routes P2 and P3 connected to the switch 1413 are unavailable, the routing device 1800 may verify whether any 2-extra-hop routes (not shown) connected to the switch 1413 are available. In other words, when a preferred/minimal route is not available, there may be a search for suitable routes (e.g., ones that include a particular switch associated with the relevant traffic), and the search may go in order from shortest routes to longer routes.

In operation 1345, the routing device 1800 may transmit traffic through the route P4 connected to the switch 1411.

In operation 1350, the routing device 1800 may verify again whether the minimal route P1 is available.

In operation 1355, when the minimal route P1 is available, the routing device 1800 may change the switch for network transmission from the switch 1411 to the switch 1413, and transmit traffic through the minimal route P1.

In an example, the routing device 1800 may provide a method of effectively transmitting traffic by selecting a switch for traffic transmission based on a hop count and/or selecting a route based on the hop count.

Figure 15:
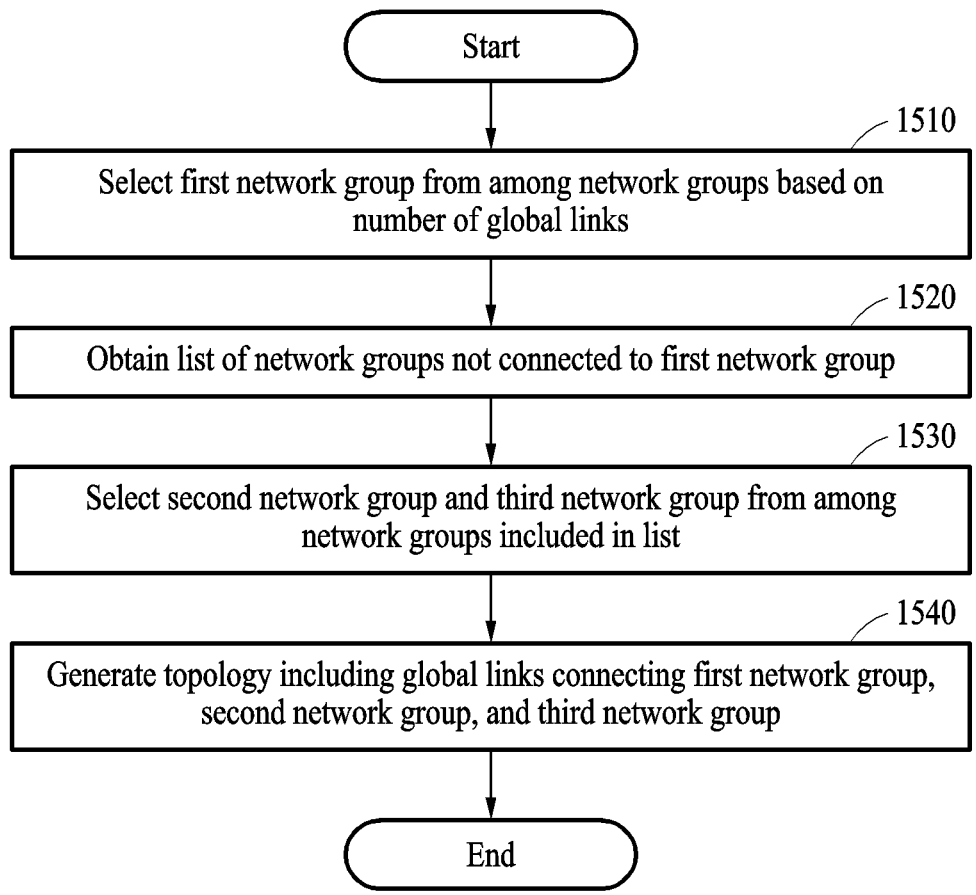
FIG. 15 illustrates an example method of operating a topology generation device according to one or more example embodiments.

FIG. 15 illustrates an example method of operating a topology generation device according to one or more example embodiments.

In operation 1510, the topology generation device 1700 may select a first network group (e.g., the network group G1 of FIG. 6) based on the numbers of global links connecting respective network groups (e.g., the network groups G1 to G9 of FIGS. 6 to 9).

In operation 1520, the topology generation device 1700 may obtain a list of network groups not connected to the first network group (e.g., G1) among the network groups (e.g., G1 to G9).

In operation 1530, the topology generation device 1700 may select a second network group (e.g., the network group G2 of FIG. 6) and a third network group (e.g., the network group G3 of FIG. 6) from among the network groups included in the list of operation 1520 (the list based on connections between the network groups included in the list).

In operation 1540, the topology generation device 1700 may generate a topology including global links inter-connecting selected network groups, e.g., the first network group G1, the second network group G2, and the third network group G3 (i.e., connecting the network groups to each other).

Figure 16:
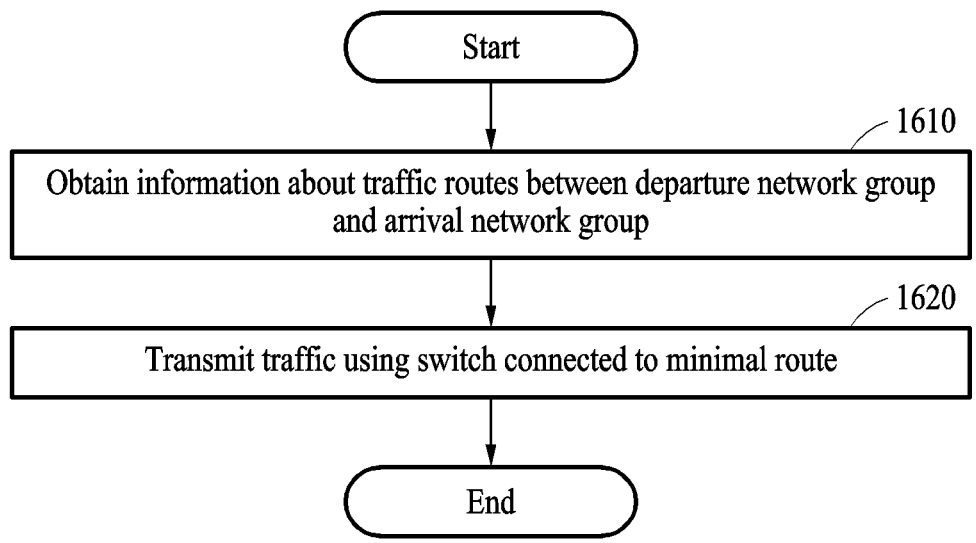
FIG. 16 illustrates an example method of operating a routing device according to one or more example embodiments.

FIG. 16 illustrates an example method of operating a routing device according to one or more example embodiments.

In operation 1610, the routing device 1800 may obtain information about routes (e.g., the routes P1 to P4 of FIG. 14) between a departure network group (e.g., the network group 1410 of FIG. 14) and an arrival network group (e.g., the network group 1420 of FIG. 14).

In operation 1620, the routing device 1800 may transmit traffic using a switch (e.g., the switch 1413 of FIG. 14) connected to a minimal route (e.g., the route P1 of FIG. 14), which may directly connect the departure network group 1410 and the arrival network group 1420.

Figure 17:
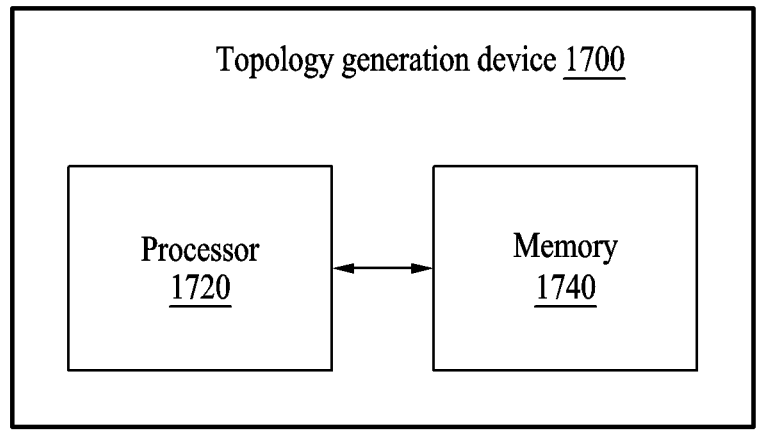
FIG. 17 illustrates an example topology generation device according to one or more example embodiments.

FIG. 17 illustrates an example topology generation device according to one or more example embodiments.

Referring to FIG. 17, the topology generation device 1700 may include a memory 1740 and a processor 1720.

The memory 1740 may store instructions (or a program) executable by the processor 1720. For example, the instructions may include instructions for executing an operation of the processor 1720 and/or an operation of each component of the processor 1720.

The processor 1720 may process data stored in the memory 1740. The processor 1720 may execute computer-readable code (e.g., software) stored in the memory 1740 and instructions triggered by the processor 1720.

The processor 1720 may be a hardware-implemented data processing device having a physically structured circuit to execute desired operations. The desired operations may include, for example, code or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

Operations performed by the processor 1720 may be substantially the same as the operations of the topology generation device 1700 described above with reference to FIGS. 5 to 12 and a more detailed description thereof will thus be omitted here.

In an example, the topology generation device 1700 may be implemented in various forms. For example, the topology generation device 1700 may be implemented as a separate device (e.g., an electronic device such as a personal computer (PC), a smartphone, and a laptop). For another example, the topology generation device 1700 may be substantially the same as a server (e.g., one of the servers 130 of FIG. 1 and one of the servers 330 of FIG. 3), or may be included in a server (e.g., the server 130 or 330). For another example, the topology generation device 1700 may be substantially the same as a switch (e.g., one of the switches 150 of FIG. 1 and one of the switches 350 of FIG. 3), or may be included in the switch (e.g., the switch 150 or 350). The topology generation device 1700 may also be implemented as a network controller, may be implemented in a gateway, and so forth. In some implementations, a path selection engine may be provided for (e.g., executed in) each server, which may enables selecting an initial path (network card) for transmission of traffic. Configuring a topology using algorithms described above may, in some cases, ensure securing as many 1-extra-hop routes as possible between each group, which may facilitate, for example, bypassing transmission of traffic with a low overhead when a minimal route is congested. In some implementations, a switch may send a packet to a host/server and request a change of path if considered necessary and the host may either accept or ignore it.

In some examples, the network may include PCIe/CXL components (e.g., links, switches, NICs, etc.) that may form a PCIe/CXL fabric, and topology and adaptive routing techniques described herein may significantly improve overall performance of the fabric of the PCI3/CXL network. CXL fabric management may be performed using a CXL Fabric Manager Application Programming Interface (FM API). A CXL Fabric Manager (FM) be an application that controls topology and allocation of resources. The FM may be embedded in the firmware of a device (shown in FIG. 1a) such as a CXL switch, reside on a host/server, or may be run in a Baseboard Management Controller (BMC). The FM may logically bind ports on a CXL switch to any single host/server, assign links, etc.

Figure 18:
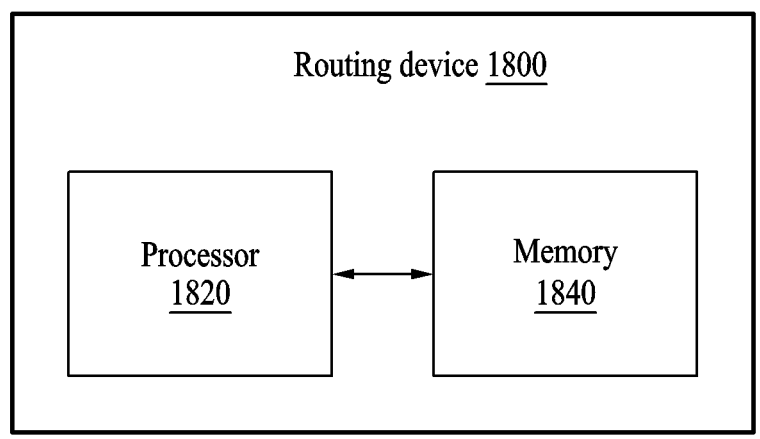
FIG. 18 illustrates an example routing device according to one or more example embodiments.

FIG. 18 illustrates an example routing device according to one or more example embodiments.

Referring to FIG. 18, the routing device 1800 may include a memory 1840 and a processor 1820.

The memory 1840 may store instructions (or a program) executable by the processor 1820. For example, the instructions may include instructions for executing an operation of the processor 1820 and/or an operation of each component of the processor 1820.

The processor 1820 may process data stored in the memory 1840. The processor 1820 may execute computer-readable code (e.g., software) stored in the memory 1840 and instructions triggered by the processor 1820.

The processor 1820 may be a hardware-implemented data processing device having a physically structured circuit to execute desired operations. The desired operations may include, for example, code or instructions included in a program.

The hardware-implemented data processing device may include, for example, a microprocessor, a CPU, a processor core, a multi-core processor, a multiprocessor, an ASIC, and an FPGA.

Operations performed by the processor 1820 may be substantially the same as the operations of the routing device 1800 described above with reference to FIGS. 13, 14, and 16 and a more detailed description thereof will thus be omitted here.

In an example, the routing device 1800 may be implemented in various forms. For example, the routing device 1800 may be implemented in, or as, a separate device (e.g., an electronic device such as a PC, a smartphone, and a laptop). For another example, the routing device 1800 may be substantially the same as a server (e.g., one of the servers 130 of FIG. 1 and one of the servers 330 of FIG. 3), or may be included in the server (e.g., the server 130 or 330). For another example, the routing device 1800 may be substantially the same as a switch (e.g., one of the switches 150 of FIG. 1 and one of the switches 350 of FIG. 3), or may be included in the switch (e.g., the switch 150 or 350).

The computing apparatuses, the electronic devices, the processors, the memories, the displays, the information output system and hardware, the storage devices, the switches, the servers, and other apparatuses, devices, units, modules, and components described herein with respect to FIGS. 1-18 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-18 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A device comprising:
a memory comprising instructions; and
one or more processors electrically connected with the memory and configured to execute the instructions, wherein the instructions are configured to, when executed by the one or more processors, cause the one or more processors to perform operations comprising:
selecting a first network group from among network groups, wherein the first network group is selected from among the network groups based on numbers of global links connecting the network groups, respectively;
obtaining a first list of network groups, among the network groups, that are not connected to the first network group;
selecting a second network group and a third network group from among the network groups in the first list based on connections between the network groups in the first list; and
based on the selecting of the first, second, and third network groups, forming a topology comprising global links connecting the first network group, the second network group, and the third network group each to each other.

2. The device of claim 1, wherein each of the network groups comprises:
a respective plurality of servers and a respective plurality of switches.

3. The device of claim 2, wherein each network group further comprises a plurality of servers, and wherein each plurality of switches is connected by a respective local link to the plurality of servers in its network group.

4. The device of claim 2, wherein each plurality of switches is connected by a global link to the plurality of switches in its network group.

5. The device of claim 1, wherein the selecting of the first network group comprises:
selecting, as the first network group, a network group among the network groups determined to have the least number of global links among the network groups.

6. The device of claim 1, wherein the selecting of the second network group and the third network group comprises:
obtaining a second list of network group pairs in the first list, wherein each of the network groups in each pair in the second list are not connected to each other;
selecting one network group pair from among the network group pairs in the second list based on a number of global links corresponding to the one network group;
selecting one of the network groups from the one network group pair as the second network group; and
selecting the other of the network groups from the one network group pair as the third network group.

7. The device of claim 6, wherein the selecting of the one network group pair comprises:
selecting, as the one network group pair, the network group pair in the second list of network group pairs that has the least number of global links among the network group pairs in the second list.

8. The device of claim 1, wherein the forming of the topology comprises:
selecting a first switch from the first network group, a second switch from the second network group, and a third switch comprised from the third network group, the selecting based on the numbers of ports of the respective switches in each of the first, second, and third network group; and
forming the topology to comprise global links connecting the first switch, the second switch, and the third switch each to each other.

9. The device of claim 8, wherein the numbers of the ports are numbers of available ports.

10. The device of claim 9, wherein each of the first switch, the second switch, and the third switch has two or more available ports.

11. The device of claim 1, wherein the global links comprise Peripheral Component Interconnect Express (PCIe) links.

12. The device of claim 11, wherein the global links are links of a PCIe-based fabric.

13. A routing device for a network generated by the device of claim 1, comprising:
a memory comprising instructions; and
a processor electrically coupled with the memory and configured to execute the instructions,
wherein, the instructions are configured to, when executed by the processor, cause the processor to perform operations comprising:
obtaining information about routes between a departure network group and an arrival network group; and
transmitting traffic using, as selected from among switches comprised in the departure network group, a first switch connected to a first route that directly connects the departure network group and the arrival network group.

14. The routing device of claim 13, wherein the transmitting of the traffic comprises:
transmitting the traffic through the first route.

15. The routing device of claim 13, wherein the transmitting of the traffic comprises:
transmitting the traffic through a second route other than the first route among routes connected to the first switch, wherein the second route is selected for the transmitting thereby based on a state of the first route.

16. The routing device of claim 15, wherein the second route is a route, other than the first route, determined to have the least number of hop counts among the routes connected to the first switch.

17. The routing device of claim 13, wherein the transmitting of the traffic comprises:
transmitting the traffic using a second switch other than the first switch among the plurality of switches, wherein the second switch is selected for the transmitting based on hop counts of respective routes connected to the first switch.

18. The routing device of claim 17, wherein the selecting of the second switch is responsive to determining that the hop count of the second switch is greater than or equal to a threshold value.

19. The routing device of claim 17, wherein the second switch is connected to a route having the least hop count among the switches not including the first switch.

20. A network system comprising network groups, wherein each of the network groups comprises:

servers; and network switches for communication among the network groups, wherein the network groups are connected to each other based on a topology generated by the device of claim 1.

* * * * *